(No Model.)
W. B. SWINDELL.
COMBINED TRUCK AND SCALE.
No. 581,889.  Patented May 4, 1897.
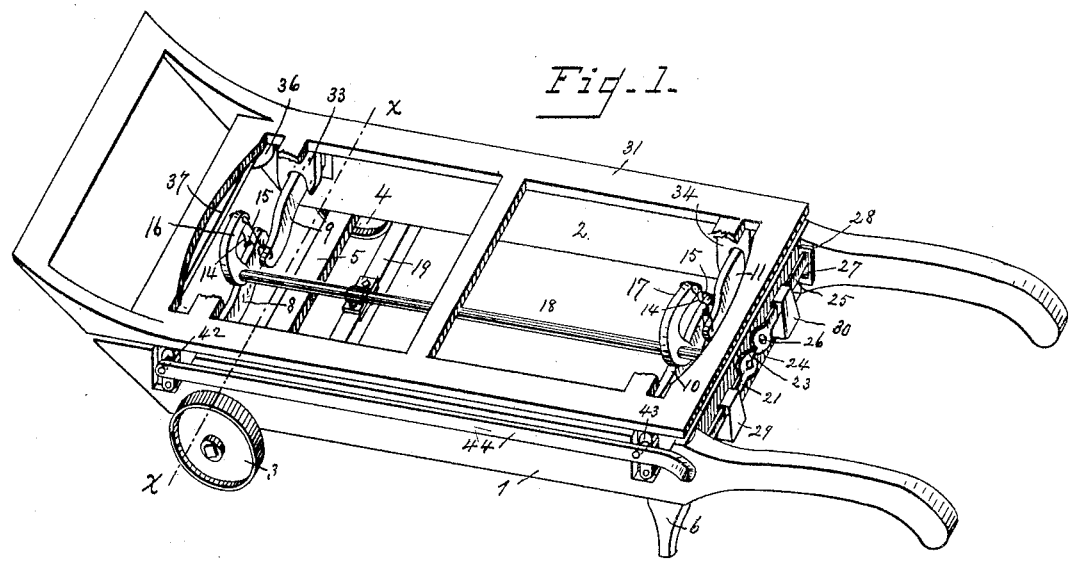
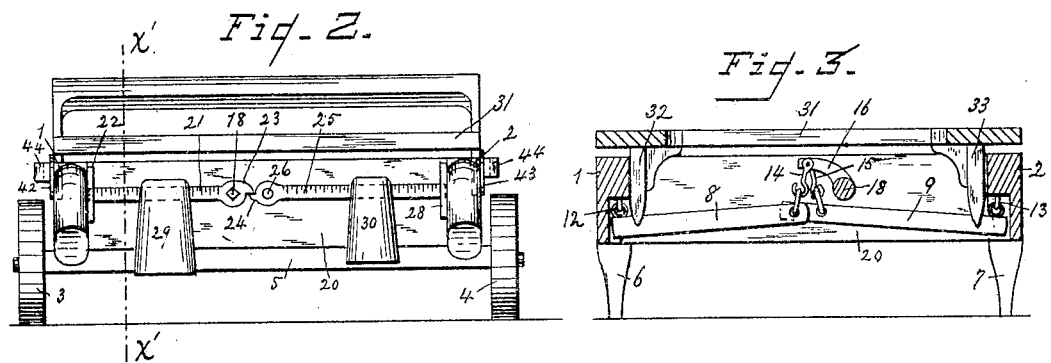
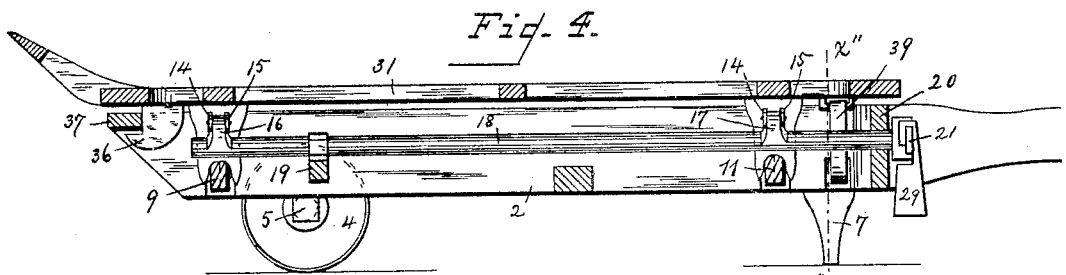
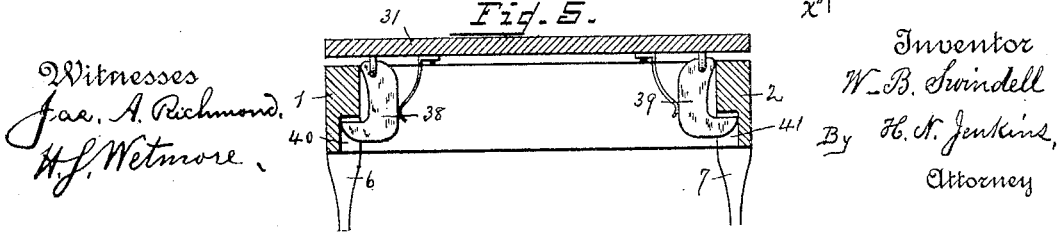

UNITED STATES PATENT OFFICE.

WALTER B. SWINDELL, OF CHARLOTTE, NORTH CAROLINA.

COMBINED TRUCK AND SCALE.

SPECIFICATION forming part of Letters Patent No. 581,889, dated May 4, 1897.

Application filed May 11, 1896. Serial No. 591,104. (No model.)

*To all whom it may concern:*

Be it known that I, WALTER B. SWINDELL, a citizen of the United States, residing at Charlotte, in the county of Mecklenburg and State of North Carolina, have invented new and useful Improvements in a Combined Freight-Carrier and Weighing-Scale, of which the following is a specification.

This invention relates to certain improvements in weighing apparatus and in the combination of same with a truck or other freight-carrier.

The construction and operation of my invention will be readily understood by referring to the accompanying drawings, whereon—

Figure 1 is a perspective view of a hand-truck provided with my weighing apparatus, portions of the scale-platform being broken away in order to more clearly illustrate the working mechanism. Fig. 2 is a rear elevation of the truck, showing the scale-beams and peas. Fig. 3 is a vertical transverse section through the line $x\,x$ of Fig. 1. Fig. 4 is a longitudinal section through the line $x'\,x'$ of Fig. 2, and Fig. 5 is a vertical transverse section through the line $x''\,x''$ of Fig. 4.

Referring again to the drawings, the side rails of the truck are designated by the numerals 1 2, which are connected by a suitable number of transverse rails and supported at the front end by a pair of wheels 3 4, mounted on an axle 5, and at the rear by a pair of legs 6 7, so as to hold the truck, when at rest, in a horizontal position.

The truck-frame is provided near each end thereof with a pair of inwardly-projecting levers 8 9 10 11. The outer ends of these levers are suspended within notches formed in the side rails 1 and 2, either by metallic eyes, as shown at 12 13, or in any other suitable manner, while their opposite ends extend to the center of the truck, where they are separately connected by links 14 15 with their respective side arms 16 17 of the longitudinal shaft 18, having journal-bearings in the transverse piece 19 and end piece 20 of the truck-frame. That end of the shaft 18 which projects through the rear end of the truck-frame has secured thereon a scale-beam 21, the outer end of which is adapted to operate in a vertical slot formed in a side block 22 to limit the upward and downward movement of said beam.

The inner end of the beam 21 is provided with a projecting lug 23, against the straight under surface of which the projection 24 of a second beam 25 is adapted to operate. This beam 25 operates on a pivot 26 and has its outer end arranged to operate in the vertical slot 27 of a block 28, and each of the aforesaid beams is provided with peas or weights, as indicated at 29 30 in Figs. 1 and 2.

The beam 25, provided with the small pea 30, is intended for weighing small quantities and fractions of one hundred pounds, while the beam 21, having the large weight 29, affords means for weighing heavy articles. For example, suppose a bale of cotton weighs three hundred and sixty-five pounds. The pea 29 on beam 21 would be placed at the notch "300" and the pea 30 on beam 25 would be moved to the notch "65," which would give the exact weight—three hundred and sixty-five pounds. The scale-beams are arranged in this manner in order that light or heavy articles may be weighed without the necessity of having extra loose peas or weights, as in other scales.

The top of the truck or scale-platform 31 has its under surface provided near each corner thereof with a bifurcated projection 32 33 34 35 to straddle the levers 8 9 10 11 and be supported thereby, so that the elevation of the platform 31 shall be somewhat above that of the top of the truck-frame, and thus leave sufficient space between the two for the downward movement of the platform when loaded.

To prevent the separation of the platform from the truck-frame when unloading or tilting, the under side of the platform is provided near each front corner with a lug 36, having a forward projection adapted to fit under the front cross-rail 37 of the truck-frame, while the rear corner of the platform is provided with depending spring-actuated catches 38 39, adapted to engage notches formed in the sides of the truck-frame, as clearly shown at 40 41 in Fig. 5.

To relieve the weighing mechanism of the weight of the platform and goods thereon when the action of said mechanism is not required, I provide each truck-rail 1 2 with two or more pivotal cams 42 43 and connect the cams of each side by a rod 44, the movement of which will cause the free ends of the cam to operate against the under surface of the platform, and thus either raise or lower the same, as occasion may require.

Having described my invention, what I claim as new, and desire to secure by Letters Patent, is—

In combination with a freight-carrier provided with weighing mechanism, consisting of a rocking shaft, having side arms, a series of levers suspended from said arms, and from the sides of the carrier-frame, a platform having downward projections adapted to rest on the levers, and a beam secured to one end of the rocking shaft; a projecting lug at the inner end of the beam, as described, and a second beam having an inner projection, the second beam pivoted to the frame of the freight-carrier, so that the inner projection of the second beam may operate against the under surface of the projecting lug of the first beam, substantially as specified.

In testimony whereof I affix my signature in the presence of two witnesses.

WALTER B. SWINDELL.

Witnesses:
A. H. WEARN,
C. S. STONE.